(12) United States Patent
Bar-Ness et al.

(10) Patent No.: US 7,860,179 B2
(45) Date of Patent: Dec. 28, 2010

(54) COMBINED FREQUENCY-TIME DOMAIN POWER ADAPTATION FOR CDMA COMMUNICATION SYSTEMS

(75) Inventors: Yeheskel Bar-Ness, Marlboro, NJ (US); Ye-Hoon Lee, Suwon (KR)

(73) Assignee: New Jersey Institute of Technology, Newark, NJ (US)

( * ) Notice: Subject to any disclaimer, the term of this patent is extended or adjusted under 35 U.S.C. 154(b) by 173 days.

(21) Appl. No.: 12/349,219

(22) Filed: Jan. 6, 2009

(65) Prior Publication Data

US 2009/0147749 A1 Jun. 11, 2009

Related U.S. Application Data

(63) Continuation of application No. 11/077,435, filed on Mar. 10, 2005, now Pat. No. 7,483,493.

(60) Provisional application No. 60/551,889, filed on Mar. 10, 2004.

(51) Int. Cl.
 *H04L 1/02* (2006.01)
 *H04B 7/00* (2006.01)
(52) U.S. Cl. ...................... 375/260; 455/522
(58) Field of Classification Search ............... None
 See application file for complete search history.

(56) References Cited

U.S. PATENT DOCUMENTS

| | | | |
|---|---|---|---|
| 6,385,462 | B1 | 5/2002 | Baum et al. |
| 6,859,503 | B2 | 2/2005 | Pautler et al. |
| 7,012,883 | B2 | 3/2006 | Jalali et al. |
| 7,103,326 | B2 | 9/2006 | Wu et al. |
| 7,286,609 | B2 | 10/2007 | Maltsev et al. |
| 7,480,341 | B2 * | 1/2009 | Jeong et al. ............ 375/267 |
| 2003/0185309 | A1 | 10/2003 | Pautler et al. |

OTHER PUBLICATIONS

L. C. Yun and D. G. Messerschmitt, "Variable Quality of Service in CDMA Systems by Statistical Power Control", Proc. IEEE ICC, Jun. 1995, pp. 713-719.

(Continued)

*Primary Examiner*—Khanh C Tran
(74) *Attorney, Agent, or Firm*—Connolly Bove Lodge & Hutz LLP

(57) ABSTRACT

Practical transmission power adaptation in multicarrier code division multiple access (MC-CDMA) communications is using either a frequency domain technique or a time domain technique or a combined frequency and time domain technique in response to channel variations. With frequency domain power adaptation, the transmission power is allocated over the N' ($1 \leq N' \leq N$) strongest subcarriers rather than over all possible N subcarriers, where the strongest subcarriers are understood to exhibit the highest channel gains. A substantially optimal N' can be chosen so that the average bit error rate (BER) is minimized. In the time domain power adaptation technique, transmission power is adapted so that the desired signal strength at the receiver output is maintained at a fixed level. In the combined time and frequency domain adaptation technique, the transmission power is first allocated over the N' ($1 \leq N' \leq N$) strongest subcarriers rather than over all possible N subcarriers and then it is adapted so that the desired signal strength at the receiver output is maintained at a fixed level.

28 Claims, 8 Drawing Sheets

OTHER PUBLICATIONS

S. Moshavi, "Multi-User Detection for DS-CDMA Communications", IEEE Communications Magaine, Oct. 1996, pp. 124-136.

S. Hara, R. Prasad, "Overview of Multicarrier CDMA", IEEE Communications Magazine, Dec. 1997, pp. 126-133.

W-M. Tam and F. C. M. Lau, "Analysis of Power Control and Its Imperfections in CDMA Cellular Systems", IEEE Transactions on Vehicular Technology, vol. 48, No. 5, Sep. 1999, pp. 1706-1717.

S. W. Kim and Y. H. Lee, "Combined Rate and Poewr Adaptation in DS/CDMA Communications Over Nakagami Fading Chennels", IEEE Transactions on Communications, vol. 48, No. 1, Jan. 2000, pp. 162-168.

S. Verdu, "Wireless Bandwidth in the Making", IEEE Communications Magazine, Jul. 2000, pp. 53-58.

T. Kim et al., "Multi-Code Multicarrier CDMA: Performance Analysis", Nov. 18, 2005.

* cited by examiner

COMBINED FREQUENCY-TIME DOMAIN POWER ADAPTATION FOR CDMA COMMUNICATION SYSTEMS

CROSS REFERENCE TO RELATED APPLICATIONS

This application is a Continuation Application of U.S. application Ser. No. 11/077,435, filed Mar. 10, 2005, which claims the benefit of priority from U.S. Provisional Patent Application Ser. No. 60/551,889, filed Mar. 10, 2004, the entire contents of which are incorporated herein in their entireties.

GOVERNMENT RIGHTS

The United States government may have certain rights in this invention. A portion of the work described herein was supported in part by the National Science Foundation under NSF Grant ANS-03338788.

BACKGROUND OF THE INVENTION

1. Field of the Invention

This invention relates to a method and apparatus for wireless communications and, more particularly, to adaptive power control for CDMA communication systems.

2. Description of the Related Art

Code division multiple access (CDMA) is one of several techniques for multiplexing wireless users. In CDMA systems, users are multiplexed over the same wireless channel by using distinct spreading codes rather than by using orthogonal frequency bands as in frequency division multiple access (FDMA) systems or by using orthogonal time bands as in time division multiple access (TDMA) systems. In CDMA systems, all the users can transmit simultaneously using the entire available transmission spectrum.

Power control is an important part of these systems. Such power control can have a substantial impact on the capacity and apparent quality of service of the CDMA system. The need for power control in these systems arises at least from the need to mitigate intercell interference that arises from frequency reuse. In CDMA systems, a further need for power control arises for minimizing intracell interference. For current code-division multiple-access (CDMA) cellular systems (IS-95), transmission power is adapted so as to maintain the same received desired power level from all mobiles. When a wireless transmitter is provided with suitable channel state information (CSI), adaptation of the transmission power in response to channel variations can be a powerful and efficient fading mitigation technique in wireless communication systems.

In recent years, there has been considerable interest in multicarrier (MC) modulation techniques for high bit rate applications in fading channels. MC-CDMA modulation, a combination of frequency domain spreading and multicarrier modulation, is employed to achieve frequency diversity and multiple access operation. MC-CDMA systems generally are divided into two types: the first type encodes the original data sequence for a user via a spreading sequence and then a different carrier with each chip, and the second type spreads serial-to-parallel converted data sequences using a given spreading code and then modulates a different carrier with each of the data sequences. Se, for example, S. Hara et al. "*Overview of multicarrier CDMA,*" *IEEE Communications Magazine*, pp. 126-133 (December 1997). A conventional MC-CDMA transmitter allocates the available transmission power uniformly over all subcarriers.

In MC-CDMA systems, a form of power control or adaptation proposed wherein the transmitter uses only those subcarriers for which channel gains are higher than the given threshold level and truncates or turns off the other subcarriers while applying maximal ratio combining (MRC) at the receiver. See Zhu et al, "*Performance of MC-CDMA systems using controlled MRC with power control in Raleigh fading channel,*" *Elec. Lett.*, Vol. 36, pp. 752-53 (April 2000). This approach, however, results in transmission outages when the channel gains of all subcarriers are below the threshold level, a condition that is unacceptable for most communication traffic that is intolerant for any number of reasons to delay. A power allocation algorithm for MC-CDMA with a projection matrix based receiver was proposed where it was described that the optimal power allocation coefficients are the components of the eigenvector which corresponds to maximum eigenvalue of modified projection matrix orthogonal to the interference signal space. See Zhu et al., "*Power allocation algorithm in MC-CDMA,*" *Proc. IEEE ICC*, pp. 931-35 (May 2002). This adaptation method requires the knowledge of all users' spreading codes and channel responses, which increases the system complexity especially for larger number of users, making the implementation infeasible for realistically sized systems expected in practice.

Although various adaptive power control techniques have been proposed for MC-CDMA systems, none have presented a practical solution that can be employed in currently expected communication systems based user quality of service demands and the size of the user community.

SUMMARY OF THE INVENTION

Practical transmission power adaptation in multicarrier code-division multiple-access (MC-CDMA) communications is achieved in accordance with the principles of the present invention using either a frequency domain technique or a time domain technique or a combined frequency and time domain technique in response to channel variations. With frequency domain power adaptation, the transmission power is allocated over the $N'(1 \leq N' \leq N)$ strongest subcarriers rather than over all possible N subcarriers, where the strongest subcarriers are understood to exhibit the highest channel gains. A substantially optimal N' can be chosen so that the average bit error rate (BER) is minimized.

In the time domain power adaptation technique, transmission power is adapted so that the desired signal strength at the receiver output is maintained at a fixed level. In the combined time and frequency domain adaptation technique, the transmission power is first allocated over the $N'(1 \leq N' \leq N)$ strongest subcarriers rather than over all possible N subcarriers and then it is adapted so that the desired signal strength at the receiver output is maintained at a fixed level.

In view of an average transmission power constraint placed on such systems, the frequency domain and the time domain power adaptation techniques outperform the prior art non-adaptive techniques in which constant uniform power is allocated over all the N subcarriers. In addition, the combined frequency and time domain power adaptation technique provides a significant performance gain over the frequency or time domain power adaptation techniques alone.

BRIEF DESCRIPTION OF THE DRAWINGS

A more complete understanding of the invention may be obtained by reading the following description of specific illustrative embodiments of the invention in conjunction with the appended drawings in which.

Figure 1:
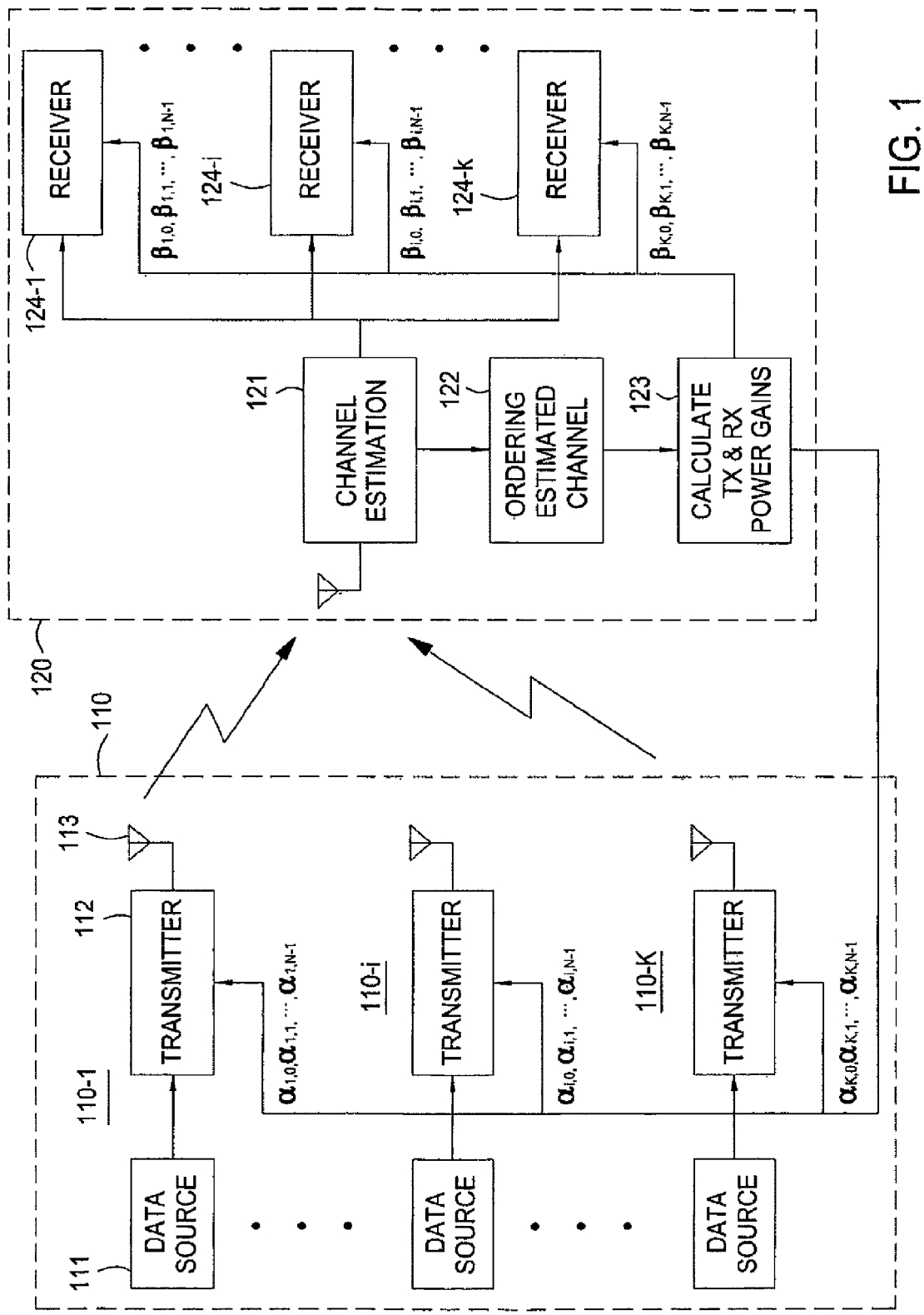
FIG. 1 shows a simplified block diagram of a CDMA wireless communication system incorporating power adaptation in accordance with the principles of the present invention.

It should be noted that the appended drawings illustrate only typical embodiments of this invention and are therefore not to be construed as limiting of its scope, for the invention may admit to other equally effective embodiments. Where possible, identical reference numerals have been inserted in the figures to denote identical elements.

DETAILED DESCRIPTION

In the description that follows, certain terms are used interchangeably. The term "user" may be interchanged with the terms "mobile", "mobile station", and "mobile user". The term "base station" is also used interchangeably with the term "base". The terms "transmit power" and "transmission power" are also used interchangeably. These usages are not intended to be limiting in any way.

The description below is organized as follows. A system model is introduced and together with a derivation of the signal-to-interference-plus-noise ratio (SINR) of the received signals with maximum ratio combining (MRC). Next, the power adaptation techniques are described and resulting bit error rate (BER) performances are analyzed. Finally, numerical results are presented with a discussion of the performance improvements provided by present transmit power adaptation techniques.

In the description below, transmission power adaptations are presented along the frequency domain, the time domain, and a combination of both the frequency and time domains in an exemplary system utilizing quasi-synchronous uplink MC-CDMA communications with an MRC receiver. This exemplary system is presented as a framework within which to understand the principles of the present invention, as opposed to limiting the applicability of this invention.

In frequency domain power adaptation, the transmission power is allocated uniformly over N'(1≦N'≦N) strongest subcarriers, which exhibit the N' largest channel gains, among the N available users on the system. When these N' subcarriers exhibit channel gains that are relatively high, the desired signal strength at the receiver increases for a given total transmission power. But it will be shown that a small number of selected power adapted subcarriers N' also leads to a reduction of effective spreading gain which, in turn, helps to mitigate multiple-access interference. The effect of selection of the number of power adapted subcarriers N' on the performance of the frequency domain power adaptation technique is described in detail below. One important effect is that there exists an optimal number of subcarriers N' that contributes to a minimization of the average BER.

In the time domain power adaptation approach, the transmission power of each user is dynamically adapted so that the desired signal strength at MRC receiver output is maintained at a fixed level. In the combined time domain and frequency domain power adaptation technique, the transmission power is first allocated over the N'(1≦N'≦N) strongest subcarriers, rather than over all possible N subcarriers, and then the transmit power is adapted so that the desired signal strength at the receiver output is maintained at a fixed level. In the description that follows, it will be shown that the combined frequency-time domain power adaptation has a significant performance gain over the power adaptation in only frequency domain or in the time and that all these transmit power adaptation techniques provide significant performance gains over a system in which power adaptation is not employed.

Figure 2:
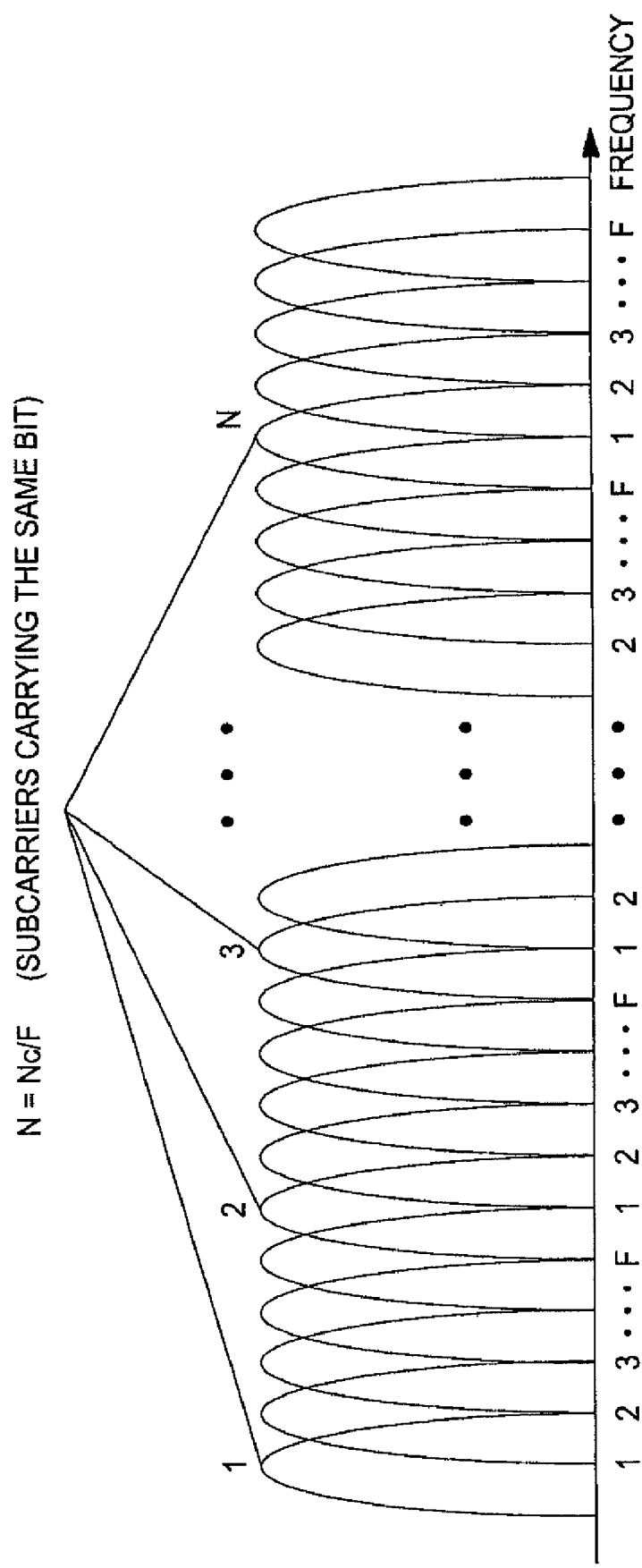
FIG. 2 shows an exemplary power spectrum of a transmitted signal using the multi-carrier communication technique.
Figure 3:
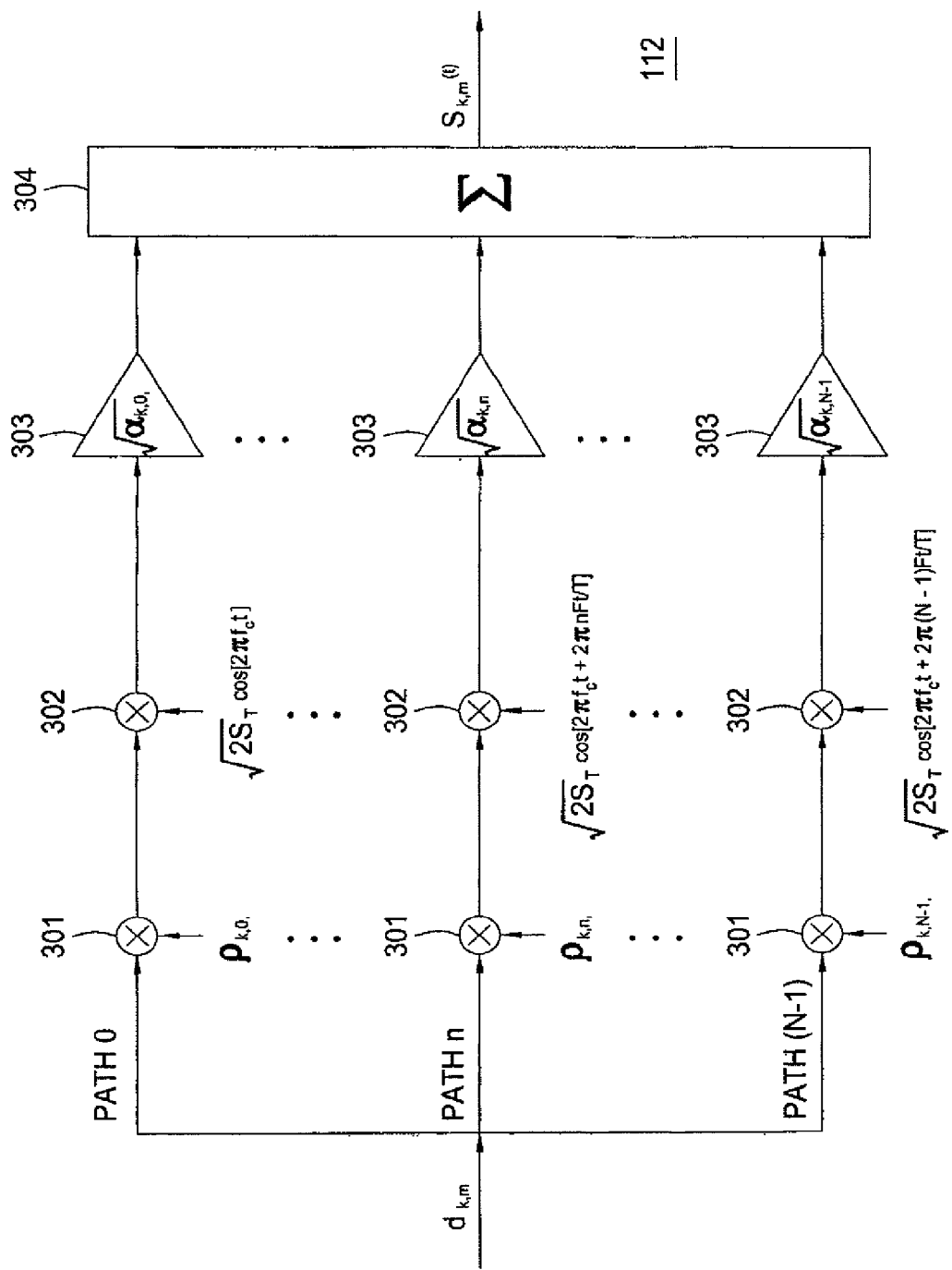
FIG. 3 shows a simplified block diagram of a portion of the modulator in the transmitter from the system in FIG. 1.
Figure 4:
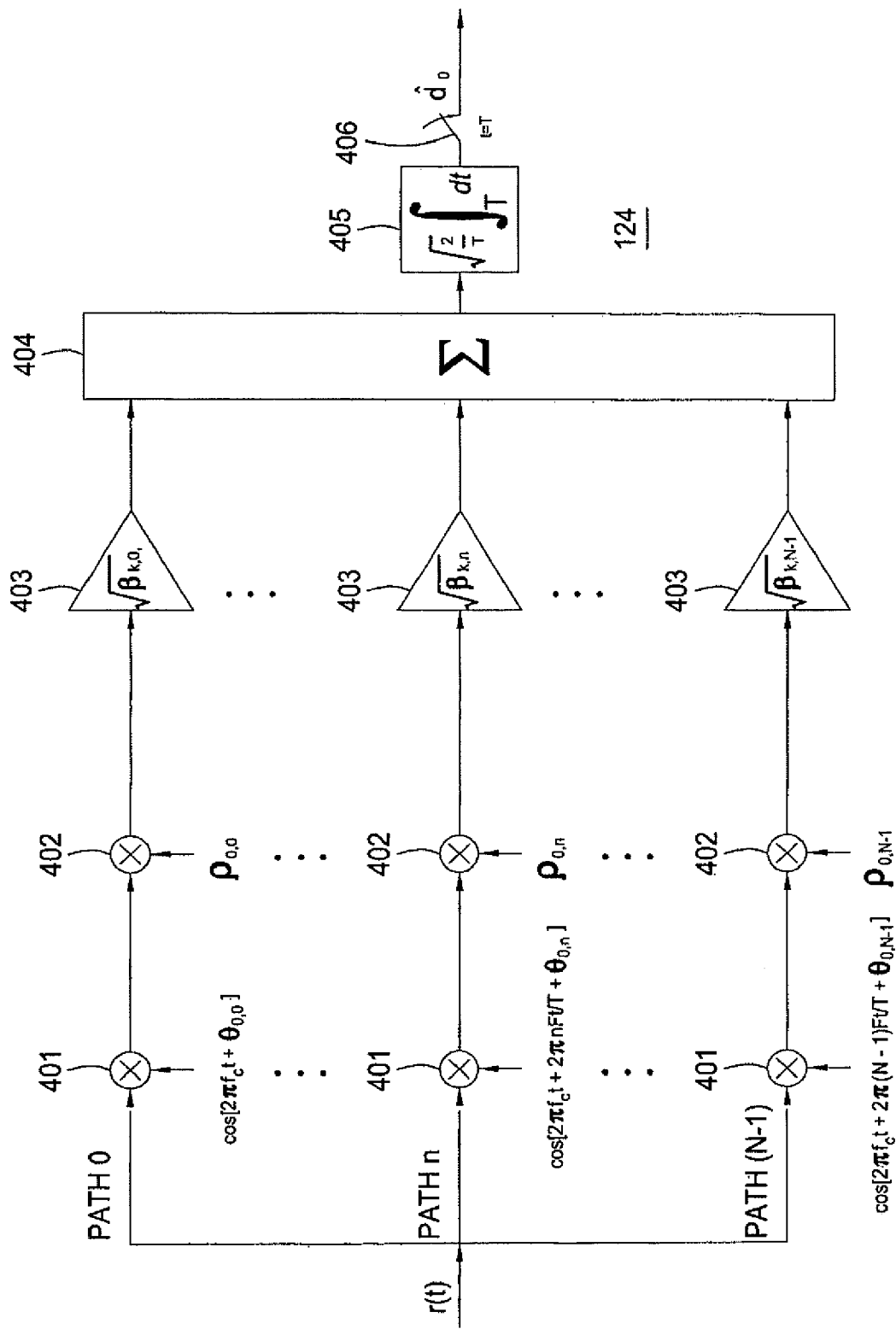
FIG. 4 shows a simplified block diagram of a portion of the demodulator in the receiver from the system in FIG. 1.

An exemplary MC-CDMA communication system is shown in FIG. 1, where K simultaneously active mobile stations 110 (i.e., mobile stations 110-1 through 110-K) communicate with a base station 120. Relevant details of the transmit power spectrum, the transmitter architecture, and the receiver architecture employed in the system of FIG. 1 are depicted in FIGS. 2-4. The system in FIG. 1 shows only one cell in a multi-cell system for ease of understanding, although the results derived herein are applicable to multi-cell systems. The implications of a multiple-cell system can be analyzed and accounted for by simply accounting for an out-of-cell interference components. In this exemplary system, channel variations due to fading are assumed to be slow relative to the data bit duration, and are also assumed to be independent for different users.

At the transmitter in the system of FIG. 1, each mobile user employs $N_c$ subcarriers and binary phase-shift-keying (BPSK) modulation. First, a user data sequence $d_k$ k=1, 0 2, . . . , K, which output by data source 111 at a rate of $1/T_s$, is serial-to-parallel (S/P) converted in transmitter 112 into F parallel streams. Each S/P converted stream, one of which is shown in FIG. 3, is spread by a spreading code p in element 301 and then mapped or copied onto a subset N of the $N_c$ subcarriers by mixer 302, where $N_c$=F×N. The mapped signals are adjusted by amplifier 303 using the α coefficients and then combined together by summing junction 304 for output to and transmission by antenna 113. The power spectrum of an exemplary transmitted signal is shown in FIG. 2. Such an arrangement of subcarriers enables each of the N MC-CDMA subcarriers channel to be assumed independent. The exemplary spectrum shown in FIG. 2 also shows the repetition of the same data bit on each of the N subcarriers from one of the F parallel data streams of the S/P converted data sequence, It should be noted that F also determines the frequency separation between neighboring subcarriers modulated by the $m^{th}$ data bit.

Generation of a transmit signal following the serial-to-parallel conversion is shown in FIG. 3. The transmitted signal corresponding to the $m^{th}$ data bit $d_{k,m}$ of the user k can be expressed as follows:

$$S_{k,m}(t) = \sum_{n=0}^{N-1} \sqrt{2\alpha_{k,n}S_T} \, d_{k,m}(t) p_{k,n}(t) \cos[2\pi f_c t + 2\pi n Ft/T] \quad (1)$$

where $p_{k,0}, p_{k,1}, \ldots, p_{k,N-1}$ represent the random spreading sequence for mobile user k, and $d_{k,m}$ is the $m^{th}$ binary data bit which is serial-to-parallel converted with bit duration of $T=FT_s$. $S_T$ is the average transmission power, and $\alpha_{k,n}$ is the transmitter power gain for the $n^{th}$ subcarrier of mobile user k. In order to meet the fixed average transmission power constraint, $$E\left[\sum_{n=0}^{N-1} \alpha_{k,n}\right]$$

should be 1 for all k∈{0, 1, ..., K−1}. It is assumed that sufficient channel state information (CSI) is available at both transmitter and receiver. Techniques for acquiring and estimating CSI are well known in the art.

For the purpose of the following analysis, it is assumed, without any loss in generality or applicability of the results, that the channel is frequency-selective, and that each subcarrier carrying the $m^{th}$ data bit experiences independent Rayleigh fading. The assumption of independent fading by each subcarrier is appropriate for channels where F/T>>$B_c$, for $B_c$ representing the coherence bandwidth. The received signal r(t) corresponding to bit m at the base station 120 can then be written as:

$$r(t) = \sum_{k=0}^{K-1}\sum_{n=0}^{N-1} \sqrt{2\alpha_{k,n}S_T G_{k,n}} \, d_{k,m}(t-\tau_k) \quad (2)$$

$$p_{k,n}(t-\tau_k)\cos[2\pi f_c t + 2\pi n Ft/T + \theta_{k,n}] + n(t),$$

where $\tau_k$ is the delay of user k, which is assumed to be independent and uniformly distributed over a bit interval; $\mu_{k,n}$ is the channel induced phase of user k at the $n^{th}$ subcarrier, which is assumed to be independent and uniformly distributed over [0,2π]; n(t) represents the white Gaussian noise with zero mean and two-sided power spectral density $N_0/2$; $G_{k,n}$ is an exponentially distributed random variable representing the channel power gain for user k at the $n^{th}$ subcarrier, whose probability density function is given by:

$$P_{G_{k,n}}(g) = \frac{1}{\Omega_0} e^{-g/\Omega_0}, \quad (3)$$

where $$\Omega_0 = E[G_{k,n}]. \quad (4)$$

It is assumed that $\Omega_0$ is normalized to unity. Due to the complex nature of the transmit signal structure, the theoretical analysis herein is focused only on the $m^{th}$ data bit carried by N subcarriers out of m, m+1, ..., m+F data bits carried by $N_c$ subcarriers.

At the base station 120, the users' signals are received by the antenna. The received signal is supplied to each of the receivers 124 corresponding to users k=1, 2, ..., K. Receiver 124 is depicted in more detail in FIG. 4 for extracting the communications from user 1 (the subscript is one less than the user identifier k). In FIG. 4, the received signal r(t) is propagated down each of N substantially similar paths. For simplicity, the operation along path n is described herein.

Mixer 401 extracts the signal on the $n^{th}$ subcarrier. This signal is then despread by correlator 402 using spreading code $p_{0,n}$. Gain of the despread signal is then adjusted by amplifier 403. Summing junction 404 combines the subcarrier constituent signals for the corresponding data bit together. After integration over a bit period by element 405, the recovered data bit $\hat{d}_0$ is output by switching element 406.

It is assumed that substantially exact synchronization (otherwise known in the art as perfect phase correction) with the desired user can be obtained. For the $m^{th}$ bit from user 1, the decision variable is given by:

$$\hat{d}_0 = \sqrt{\frac{2}{T}} \int_T r(t) \sum_{m=0}^{N-1} \sqrt{\beta_{0,m}} \, p_{0,m}(t-\tau_0)\cos[2\pi f_c t + 2\pi m Ft/T + \theta_{0,m}] dt \quad (5)$$

$$= \sum_{n=0}^{N-1} \sqrt{\alpha_{0,n}\beta_{0,n}G_{0,n}E_b} \, d_0[m] + I_{MAI} + \eta$$

where the subscript of the data bit is one less than the user identifier k (here k=1), $\beta_{k,n}$ is the receiver power gain for the $n^{th}$ subcarrier of user k, and bit energy $E_b=S_T T$. The first term in Equation (5) is the desired signal term. The second term labeled $I_{MAI}$ is the multiple-access interference term induced by the other K−1 active users, and the third term ρ is the white Gaussian noise. $I_{MAI}$ and ρ are independent random variables with mean zero and variances $$E[I_{MAI}^2] = \frac{E_b}{2}\sum_{k=1}^{K-1}\sum_{n=0}^{N-1} \beta_{0,n}E[\alpha_{k,n}G_{k,n}] \quad (6)$$

$$E[\eta^2] = \frac{N_0}{2}\sum_{n=0}^{N-1} \beta_{0,n}, \quad (7)$$

respectively. Therefore, the SINR, Γ, for the desired user 1 can be given by $$\Gamma = \frac{\left(\sum_{n=0}^{N-1}\sqrt{\alpha_{0,n}\beta_{0,n}G_{0,n}}\right)^2}{\frac{1}{2}\sum_{k=1}^{K-1}\sum_{n=0}^{N-1}\beta_{0,n}E[\alpha_{k,n}G_{k,n}] + \frac{N_0}{2E_b}\sum_{n=0}^{N-1}\beta_{0,n}}. \quad (8)$$

When channel state information (CSI) is not available at the transmitter, transmission power is not adaptively allocated. Instead it is allocated uniformly over total N subcarriers. This is commonly understood to be the case in prior art systems. Performance of such a non-adaptive transmission technique is presented below for the purpose of subsequent performance comparison with power adaptation techniques described below in accordance with the principles of the present invention. In this case, the transmitter power gain, $\alpha_{k,n}$, for user k is given by:

$$\alpha_{k,n}^{no}=1/N, \, n=0,1,\ldots,N-1. \quad (9)$$

It is reasonable to consider the maximal ratio combining (MRC) receiver in FIGS. 1 and 4 as a diversity combining method, The corresponding receiver power gain, $\beta_{k,n}$, for user k is:

$$\beta_{k,n}^{no} = G_{k,n}, \quad n = 0, 1, \ldots, N-1. \tag{10}$$

By substituting Equation (9) and Equation (10) in Equation (8), one obtains the SINR, $\Gamma_{no}$, for the prior art non-adaptive transmission technique as follows:

$$\Gamma_{no} = v_{no} \sum_{n=0}^{N-1} G_{0,n} \tag{11}$$

where $$v_{no} \triangleq \left[ \frac{K-1}{2} + \frac{N}{2} \frac{N_0}{E_b} \right]^{-1}. \tag{12}$$

Using a Gaussian approximation based on the assumption that the interference plus noise in Equation (5) is Gaussian with zero mean and a variance of $E[I_{MAI}^2] + E[\eta^2]$, it is possible to calculate the bit error rate (BER). Accordingly, the average BER for the non-adaptive transmission technique is given by $$\overline{P}_b = \int_0^\infty Q(\sqrt{v_{no}g}) P_{G_0}(g) dg \tag{13}$$

where $P_b$ is the probability of a bit error and parameters Q(x) and $G_k$ are defined as follows:

$$Q(x) \triangleq \frac{1}{\sqrt{2\pi}} \int_z^\infty e^{-t^2/2} dt, \quad x \geq 0 \tag{14}$$

and $$G_k \triangleq \sum_{n=0}^{N-1} G_{b,n}, \tag{15}$$

respectively. The probability density function of $G_k$ is given by:

$$P_{G_k}(g) = \frac{g^{N-1} e^{-g}}{(N-1)!}, \quad g \geq 0. \tag{16}$$

Then by substituting Equation (16) in Equation (13) and using the result of known techniques in Proakis, *Digital Communications*, $3^{rd}$ Ed., p. 781, Eq. (144-15) (McGraw-Hill 1995), it is shown that the average BER in Equation (13) can be written as:

$$\overline{P}_b \left(\frac{1-\mu}{2}\right)^N \sum_{m=0}^{N-1} \binom{N-1+m}{m} \left(\frac{1+\mu}{2}\right)^m \tag{17}$$

where

-continued $$\mu \triangleq \sqrt{\frac{v_{no}}{2 + v_{no}}}. \tag{18}$$

Power adaptation in accordance with the principles of the present invention can be understood in the context of FIG. 1. In the base station 120, the received signal r(t) is supplied to channel estimation element 121 to obtain an estimate of the signal strength and, thereby, the channel power gains $G_k$. The estimated channel gains are then ordered in ordering element 122. Ordering is performed for the estimated channel gains in decreasing order. With the channel gains ordered, it is possible in element 123 to calculate the amplifier power gains α and β for the transmitters and receivers in the system. Once calculated by the time domain and frequency domain power adaptation techniques described below in more detail, the amplifier power gains α and β are supplied to the system transmitters and receivers. A feedback channel is shown for supplying the transmitter amplifier power gains α from the calculation element 123 to the K user mobile station transmitters.

While feedback channel is shown as a solid line in the figure, it is understood that this depiction was done for ease of understanding. The feedback channel can be realized as a real or logical or virtual wireless channel received by each of the mobile station antennas. As intended to be realized, the transmitter amplifier power gains α are received by the related mobile station on its respective antenna and are then processed and applied to the user's associated transmit power amplifiers 303 in transmitter 112, wherein the transmit power of each subcarrier is adjusted to the level related to the transmitter amplifier power gain a for that user.

As stated previously, the feedback channel can be a real channel such as a separate dedicated signaling or control channel allocated within the communication protocol. Alternatively, the feedback channel can be realized as a logical or virtual channel by using, for example, an overhead portion or a payload portion of X symbols in a data transmission sequence from the base station for transmitting the adapted transmit power gain levels. This information could be recovered by the transmitter and applied to the corresponding transmit power amplifier. It is contemplated that the feedback signal would include the sequence of adapted transmit power amplifier gain levels together with an indicator or index associating each level with its particular mobile user station.

In this section, the transmission power is allocated in accordance with the principles of the present invention uniformly over only the N'(1≦N'≦N) subcarriers that have highest channel gains rather than by distributing it over all possible N subcarriers as done in the non-adaptive transmission prior art technique described above. The transmitter power amplifier gains with such a frequency domain power adaptation technique are calculated in element 123 as follows:

$$\alpha_{k,n}^f = \begin{cases} 1/N', & \text{if } G_{k,n} > G'_{k,N'} \\ 0, & \text{otherwise} \end{cases} \tag{19}$$

where $G'_{k,0} \geq G'_{k,1} \geq \ldots \geq G'_{k,N-1}$ are the order statistics obtained by arranging the estimated channel gain for the N subcarriers of user k, $\{G_{k,n}\}_{n=1}^{N-1}$, in decreasing order. Similarly, the receiver power amplifier gains calculated using the frequency domain power adaptation are given as:

$$\beta_{k,n}^f = \begin{cases} G_{k,n}, & \text{if } G_{k,n} > G'_{k,N'} \\ 0, & \text{otherwise.} \end{cases} \quad (20)$$

It should be understood that the receiver combining formation in Equation (20) corresponds to the signal being transmitted over only N' strongest subcarriers.

Employing the frequency domain power adaptation, one can show that:

$$E[\alpha_{k,n}^f G_{k,n}] = \frac{1}{N}\left(1 + \sum_{l=N'+1}^{N} 1/l\right). \quad (21)$$

It follows from Equations (8), (19), (20), and (21) that the signal-to-interference-plus-noise ratio (SINR), $\Gamma_f$ for the frequency domain power adaptation is given by:

$$\Gamma_f = v_f Z_0 \quad (22)$$

where $$v_f \triangleq \left[\frac{(K-1)N'}{2N}\left(1 + \sum_{l=N'+1}^{N} 1/l\right) + \frac{N'}{2}\frac{N_0}{E_b}\right]^{-1} \quad (23)$$

and $$Z_0 \triangleq \sum_{n=0}^{N'-1} G'_{0,n}. \quad (24)$$

The probability density function of $Z_0$ is given by:

$$P_{Z_0}(g) = \binom{N}{N'}\left[\frac{g^{N'-1}e^{-g}}{(N'-1)!} + \sum_{l=1}^{N-N'}(-1)^{N'+l-1}\binom{N-N'}{l}\left(\frac{N'}{l}\right)^{N'-1}\right.$$
$$\left. \times e^{-g}\left(e^{-\frac{l}{N'}g} - \sum_{m=0}^{N'-2}\frac{1}{m!}\left(-\frac{l}{N'}g\right)^m\right)\right]. \quad (25)$$

Thus, the average BER with the frequency domain power adaptation is given by, $$\bar{P}_b = \int_0^\infty Q(\sqrt{v_f g})P_{Z_0}(g)dg. \quad (26)$$

By substituting Equation (25) into Equation (26) and using a published result, we get the following for average BER for the frequency domain power adaptation:

$$P_b = \frac{\binom{N}{N'}}{\pi}\int_0^{\pi/2}\frac{\sum_{l=0}^{N-N'}(-1)^l\binom{N-N'}{l}\left(1 + \frac{l}{N'} + \frac{v_f}{2\sin^2\phi}\right)^{-1}}{\left(1 + \frac{v_f}{2\sin^2\phi}\right)^{N'-1}}d\phi. \quad (27)$$

In this section, the transmission power is adapted in the time domain only. According to this technique, the transmission power is distributed over all N subcarriers and, in contrast to the prior art non-adaptive techniques, the transmission power is dynamically adapted for each symbol in the time domain so that the desired signal strength at a maximal ratio combining receiver maintains fixed desired level. The transmitter and the receiver power gains with such a power adaptation technique are random variables calculated in element 123 as follows:

$$\alpha_{k,n}^t = \alpha_k^t/N, n=0,1,\ldots,N-1 \quad (28)$$

and $$\beta_{k,n}^t = G_{k,n}, n=n=0,1,\ldots,N-1, \quad (29)$$

respectively. In order to satisfy the average transmission power constraint that applies to most commercial wireless systems, the expected value of the transmitter amplifier gain levels $E[\alpha_k^t]$ should be substantially 1.

In order to maintain the received power of the desired signal at a fixed level, $G_R^t$, the transmitter amplifier power gain is adjusted according to the following equation:

$$\alpha_k^t = G_R^t/G_k \quad (30)$$

where the channel gain $G_k$ is defined in Equation (15). It then follows from the average power constraint of the system and Equation (16) that $G_R^t$ is given by:

$$G_R^t = \frac{1}{E[1/G_k]} = \left[\frac{1}{(N-1)!}\int_0^\infty g^{N-2}e^{-g}dg\right]^{-1} = N-1, \quad (31)$$

where, in the last step, integral tables can be used.

It can be shown that, $$E[\alpha_{k,n}^t G_{k,n}] = \frac{N-1}{N^2}. \quad (32)$$

Also from Equations (28), (30), and (31), the transmitter amplifier gain levels can be expressed as, $$\alpha_{k,n}^t = \frac{N-1}{NG_k}, \quad (33)$$

$$n = 0, 1, \ldots, N-1.$$

Substituting Equations (29), (32), and (33) into Equation (8) yields the signal-to-interference-plus-noise ratio (SINR), $\Gamma_t$, for the time domain power adaptation technique as, $$\Gamma_t = \left[\frac{K-1}{2N} + \frac{N}{2(N-1)}\frac{N_0}{E_b}\right]^{-1}. \quad (34)$$

It should be noted that the SINR $\Gamma_t$ does not fluctuate with the channel fading, since the transmitter adapts its power levels to maintain a constant SINR at the receiver. The average BER realized with the time domain power adaptation is given by, $$\bar{P}_b = Q(\sqrt{\Gamma_t}) \quad (35)$$

The combined frequency-time domain power adaptation is a two-step process in which frequency domain power adaptation is performed prior to the time domain power adaptation. In the frequency domain power adaptation, the transmission power is allocated over only the subset of N' strongest subcarriers, where $1 \leq N' \leq N$. Power adaptation is the performed in the time domain to maintain the desired user signal strength at a desired fixed level. With such a combined adaptation technique, the transmitter and the receiver power amplifier gains are given by:

$$\alpha_{k,n}^{ft} = \begin{cases} \alpha_k^{ft}/N', & \text{if } G_{k,n} > G'_{k,N'} \\ 0, & \text{otherwise,} \end{cases} \quad (36)$$

and $$\beta_{k,n}^{ft} = \begin{cases} G_{k,n}, & \text{if } G_{k,n} > G'_{k,N'} \\ 0, & \text{otherwise,} \end{cases} \quad (37)$$

respectively.

In order to maintain the received power of the desired mobile station signal at a desired fixed level, the transmitter power amplifier levels are given as:

$$\alpha_k^{ft} = G_R^{ft}/Z_k, \quad (38)$$

where $Z_k$ is defined in Equation (24). To meet the average power constraint in these systems, $E[\alpha_k^{ft}]$ is preferably equal to unity. Hence, $$G_R^{ft} = \frac{1}{E[1/Z_k]} = \Psi^{-1} \quad (39)$$

where $$\Psi \triangleq E[1/Z_k] = \int_0^\infty \frac{1}{g} P_{Z_k}(g) dg. \quad (40)$$

With Equations (36), (37), and (39), it is possible to show that:

$$E[\alpha_{k,n}^{ft} G_{k,n}] = \sum_{m=0}^{N-1} E[\alpha_{k,n}^{ft} G_{k,n} \mid G_{k,n} = G'_{k,m}] Pr(G_{k,n} = G'_{k,m}) \quad (41)$$

$$= \frac{1}{N} \sum_{m=0}^{N'-1} E[\alpha_k^{ft} G'_{k,m}/N']$$

$$= \frac{G_R^{ft}}{NN'} \sum_{m=0}^{N'-1} E[G'_{k,m}/Z_k]$$

$$= \frac{1}{NN'\Psi}.$$

By substituting Equations (36), (37), and (41) into Equation (8), it is possible to show that the SINR, $\Gamma_{ft}$, for the frequency-time domain power adaptation technique as:

$$\Gamma_{ft} = \left[\frac{K-1}{2N} + \frac{N'\Psi}{2}\frac{N_0}{E_b}\right]^{-1}. \quad (42)$$

Therefore, the average BER is given by:

$$\overline{P}_b = Q(\sqrt{\Gamma_{ft}}) \quad (43)$$

Figure 5:
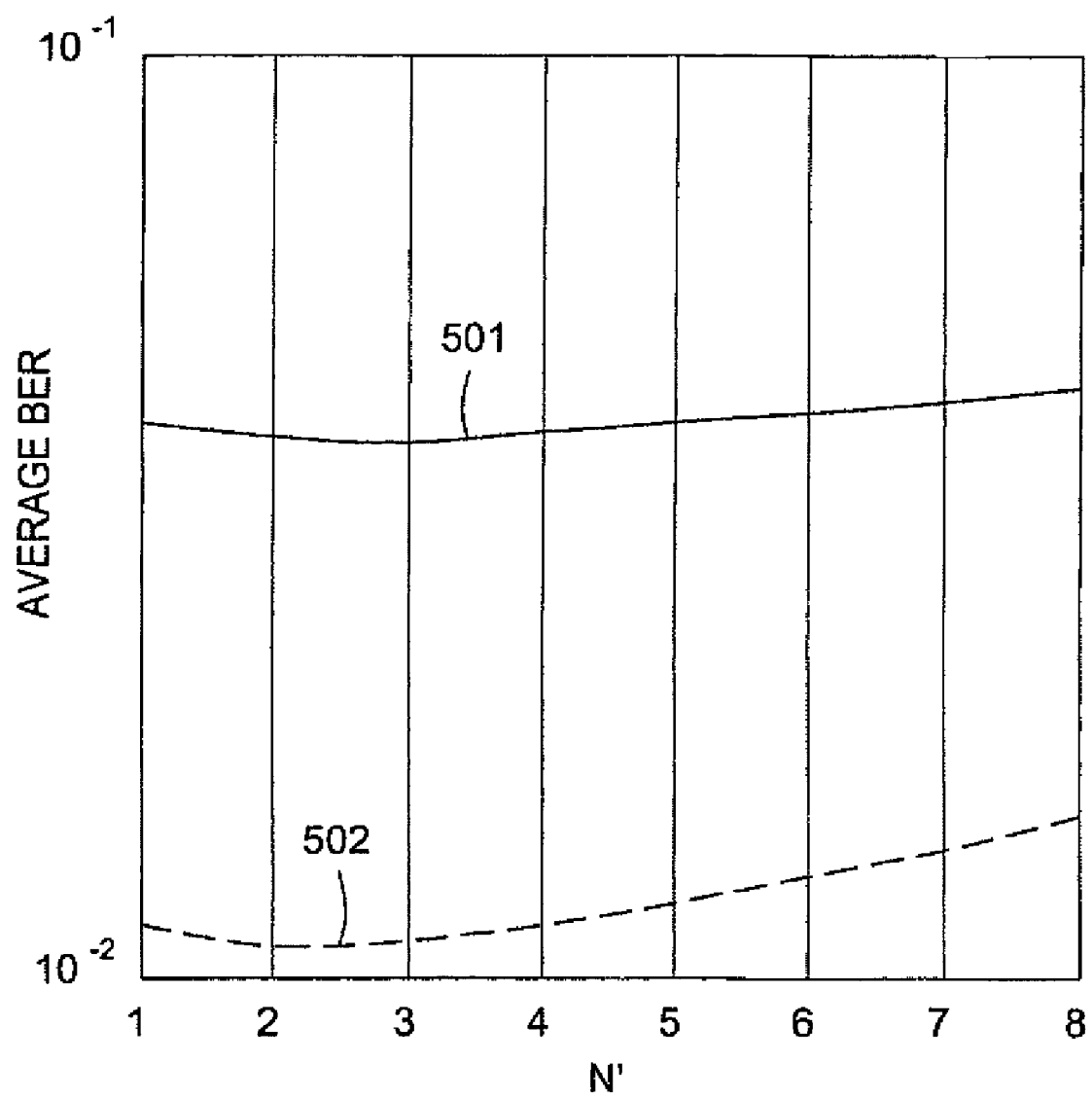
FIG. 5 shows a plot of the average bit error rate (BER) versus N' for frequency domain power adaptation in the system of FIG. 1 in accordance with the principles of the present invention.

FIG. 5 shows a plot of the average bit error rate (BER) versus N' for frequency domain power adaptation in the system of FIG. 1 in accordance with the principles of the present invention. The number of subcarriers N was selected to be 8 and the bit energy to noise spectral density ratio, $E_b/N_0$, was chosen to be 10 dB. The number of users, K, is varied from 2 in curve 502 to 5 in curve 501. In FIG. 5, the average BER in Equation (26) is depicted as a function of N', from which it can be observed that there exists a value of N' that minimizes the average BER. This set of graphs indicates that, for given system parameters, the average BER with the frequency domain power adaptation can be minimized by appropriately choosing the number of N'.

Figure 6:
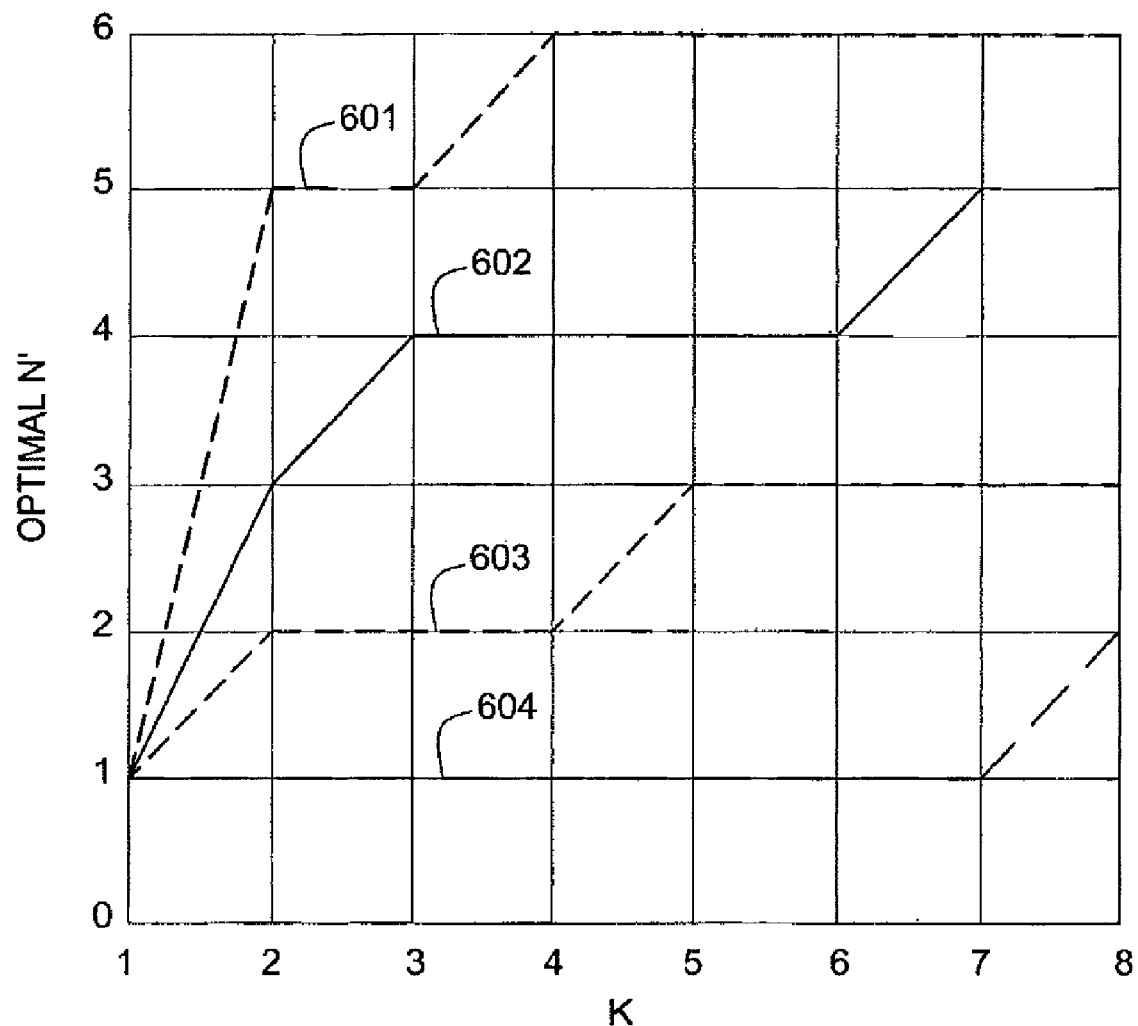
FIG. 6 shows a plot of the optimal number of N' versus the number of users K for frequency domain power adaptation in the system of FIG. 1 in accordance with the principles of the present invention.

FIG. 6 shows a plot of the optimal number of N' versus the number of users K for frequency domain power adaptation in the system of FIG. 1 in accordance with the principles of the present invention. The number of subcarriers N is again selected to be 8. In FIG. 6, the optimal N' is plotted as a function of the number of active users K for several values of $E_b/N_0$. Curve 604 utilizes $E_b/N_0$ of 5 dB; curve 603 utilizes $E_b/N_0$ of 10 dB; curve 602 utilizes $E_b/N_0$ of 15 dB; and curve 601 utilizes $E_b/N_0$ of 20 dB. The plot shows that the optimal value of N' increases with an increasing number of users K. This is because a higher spreading gain is required to mitigate the multiple access interference for larger numbers of users, K (i.e., interference limited region), On the other hand, a smaller number of optimal subcarriers N' yields better performance for a smaller number of users K (i.e., noise-limited region) because, in order to mitigate the channel fading impairment, diversity gain obtained by reducing N' is needed more than spreading gain. It should be noted that N'=1, which corresponds to selection diversity at the mobile transmitter, is optimal for single-user case, where K=1.

Figure 7:
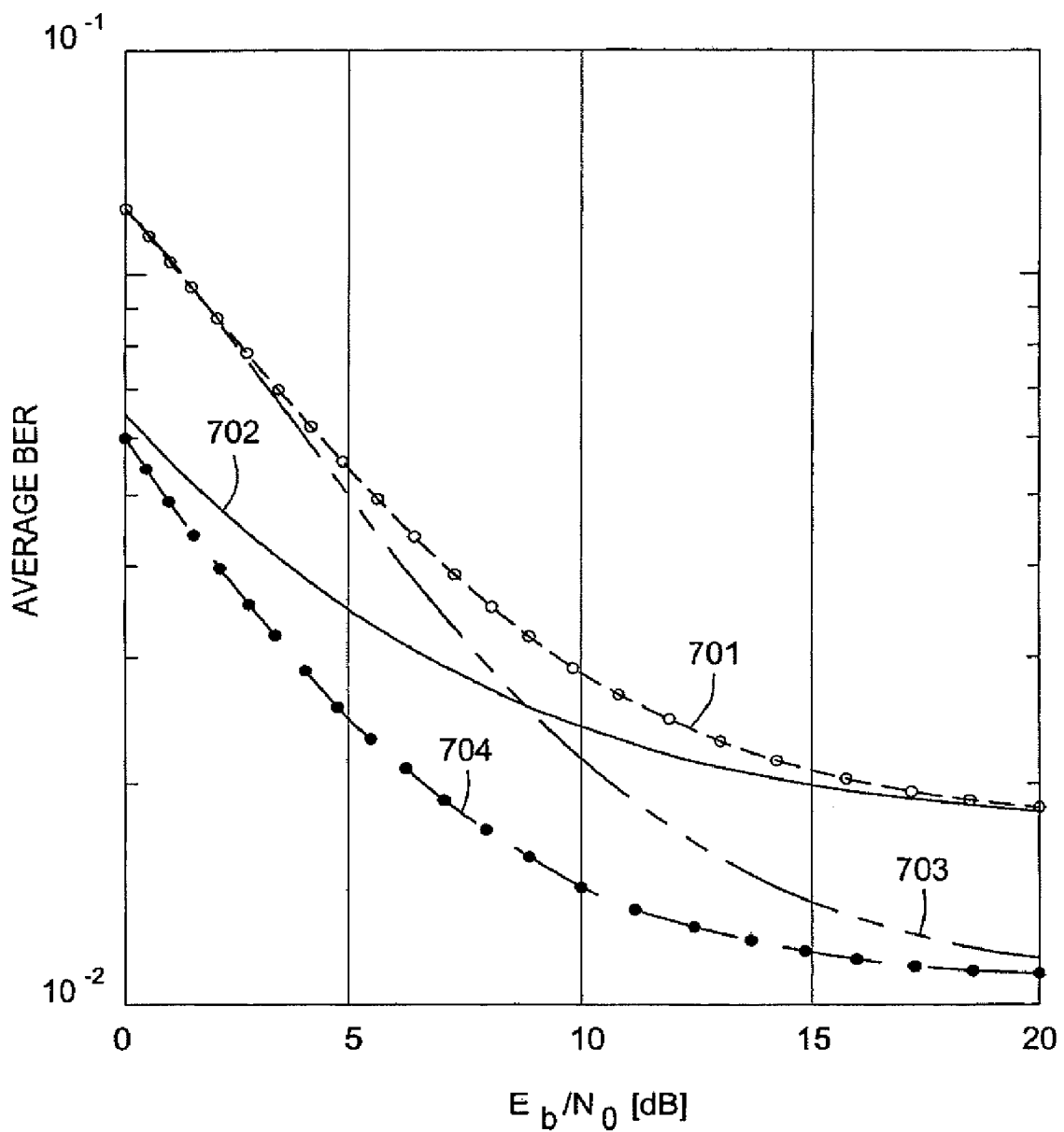
FIG. 7 shows a plot of the average BER versus $E_b/N_0$ for all types of power adaptation applied in the system of FIG. 1 in accordance with the principles of the present invention.

FIG. 7 shows a plot of the average BER versus $E_b/N_0$ for all types of power adaptation applied in the system of FIG. 1 in accordance with the principles of the present invention. The number of available subcarriers N is selected to be 8 and the number of users K is selected to be 4. The average BERs for several adaptation techniques are compared in FIG. 7, wherein the optimal N' that minimizes the average BER was used for both the frequency domain and the frequency-time domain power adaptations. It shows that the combined frequency-time domain power adaptation (curve 704) has a significant performance gain over the non-adaptive technique (curve 701). While the time domain power adaptation (curve 703) and the frequency domain power adaptation (curve 702) show better performance than the non-adaptive technique, they show complementary performance in different $E_b/N_0$ regions. For lower $E_b/N_0$ in the so-called noise-limited region, the frequency domain power adaptation outperforms the time-domain power adaptation. For higher $E_b/N_0$ in the so-called interference-limited region, the time domain power adaptation outperforms the frequency domain power adaptation. Therefore, FIG. 7 indicates that for MC-CDMA communications, joint adaptation of the transmission power in the frequency-time domain makes more efficient use of the available transmission power than power adaptation in the frequency domain or the time domain alone.

Figure 8:
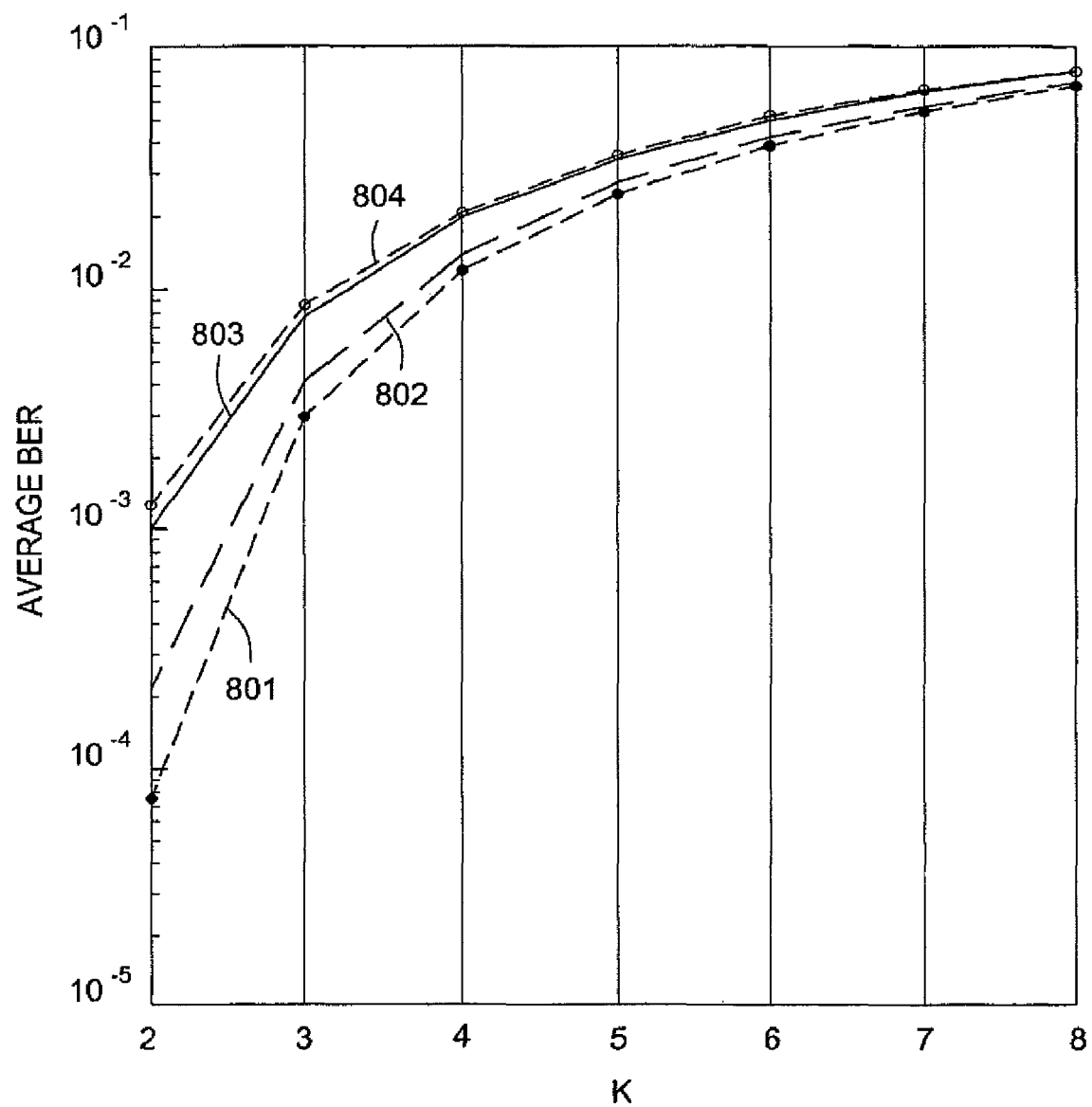
FIG. 8 shows a plot of the average BER versus the number of users K for all types of power adaptation applied in the system of FIG. 1 in accordance with the principles of the present invention.

FIG. 8 shows a plot of the average BER versus the number of users K for all types of power adaptation applied in the system of FIG. 1 in accordance with the principles of the present invention. The number of subcarriers N was selected to be 8 and the signal to noise ratio $E_b/N_0$ was chosen to be 15 dB. FIG. 8 shows the average BER versus K with several adaptation techniques. Again the combined frequency-time domain power adaptation in curve 801 yields much better performance than the non-adaptive transmission technique in curve 804 for all numbers of users, K. The performance gain becomes more pronounced as the number of users K decreases. The time domain power adaptation technique in curve 802 outperformed the frequency domain power adaptation technique in curve 803 under these conditions. Such performance gain can be translated into a reduction of the total number of subcarriers required to achieve a target BER for a given number of users, which in turn means a reduction of required system bandwidth.

The power adaptation techniques described above are based on knowledge of the channel state information on each of the subcarriers. In experimental practice, the performance of the power adaptation techniques can be negatively affected if the channel state estimation is not reliable. Therefore, the transmission power adaptations in MC-CDMA communication systems which require the transmitter to have reliable a priori CSI about the subcarriers can be applied to systems with slowly-varying channel characteristics, such as cellular systems for pedestrian or nomadic environments, wireless local area networks (WLAN or WiFi), or wireless local loop (WLL) systems.

The description above has set forth details about a novel technique for adapting transmission power in MC-CDMA communication systems in the frequency domain, in the time domain, and in a combination of the time and frequency domains. For frequency domain power adaptation, the transmission power has been allocated to only the N' strongest subcarriers. In time domain power adaptation, the transmission power is adjusted to maintain the signal strength at a fixed level. A combination of the frequency domain power adaptation and the time domain power adaptation outperforms the non-adaptive technique for 9 noise-limited and interference-limited regions, respectively. The combined adaptation of the transmission power in the combined frequency-time domain was shown to significantly outperform the power adaptation in only frequency or time domain as well as over the non-adaptive technique.

While the foregoing is directed to embodiments of the present invention, other and further embodiments of the invention may be devised without departing from the basic scope thereof, and the scope thereof is determined by the claims that follow.

What is claimed is:

1. A method for power adaptation in a multicarrier code division multiple access communication system, the method comprising:

receiving signals from a plurality of mobile stations in communication with at least one base station, each mobile station including an adaptive transmitter that includes a plurality of controllable gain amplifiers;

estimating channel power gain for each mobile station in response to the received mobile station signals, where the channel power gain is for a subcarrier of the mobile station;

ordering received signals from the mobile stations on a decreasing order basis for the corresponding estimated channel power gain from the mobile station associated with a highest channel gain to the mobile station associated with a lowest channel gain; and determining, in response to the ordered channel power gains, both a plurality of power amplifier gain levels for the controllable gain amplifiers in the adaptive transmitter and a plurality of power amplifier gain levels for controllable gain amplifiers in each of a plurality of adaptive receivers of the base station, each adaptive receiver being associated with one of the plurality of mobile stations, wherein the transmitter power amplifier gain levels and the adaptive receiver power amplifier gain levels are dynamically adapted to the estimated channel power gains for each symbol from the mobile stations in one of:

a time domain for distributing available transmission power over all subcarriers to maintain a received signal strength for signals received at the base station at a predetermined level, or a frequency domain for distributing available transmission power over a subset of all subcarriers, wherein and the subset of subcarriers exhibits the subset highest estimated channel power gains.

2. The method as defined in claim 1, wherein in the time domain, the determining step further includes the steps of:

calculating the adaptive transmitter power amplifier gain levels as follows, $\alpha_{k,n}{}^t = \alpha_k{}^t/N, n=1, 2, \ldots, N$, where $\alpha = {}_k{}^t = G_R{}^t/G_k$, $$G_k = \sum_{n=0}^{N-1} G_{k,n},$$

$G_R{}^t$ is the predetermined level and $G_{k,n}$ is the channel power gain for an $n^{th}$ subcarrier of the mobile station; and calculating the adaptive receiver power amplifier gain levels as follows:

$\beta_{k,n}{}^t = G_{k,n}, n=1, 2, \ldots, N.$

3. The method as defined in claim 2, wherein the predetermined level is substantially equal to N−1.

4. The method as defined in claim 1 further including the step of transmitting to each mobile station the adaptive transmitter power amplifier gain levels associated with the transmitter for that mobile station.

5. The method as defined in claim 4 further comprising the step of supplying to the base station receivers the adaptive receiver power amplifier gain levels associated with the receiver of signals from that mobile station.

6. The method as defined in claim 5 further comprising the step of adjusting the controllable gain amplifier gain levels at each adaptive receiver in the base station to a level defined by the associated adaptive receiver power amplifier gain levels in the transmitting step.

7. The method as defined in claim 4, wherein the transmitting step further comprises the steps of:

associating the adaptive transmitter power amplifier gain levels from the determining step with a particular mobile station; and associating the adaptive receiver power amplifier gain levels from the determining step with a particular receiver in the base station.

8. The method as defined in claim 1, wherein in the frequency domain, the determining step further includes the steps of:

calculating the adaptive transmitter power amplifier gain levels as follows, $$\alpha_{k,n}^f = \begin{cases} 1/N', & \text{if } G_{k,n} > G'_{k,N'} \\ 0, & \text{otherwise,} \end{cases}$$

where N' is the subset of subcarriers and $G'_{k,N'}$ his an order statistic obtained from the ordering step; and calculating the adaptive receiver power amplifier gain levels as follows:

$$\beta_{k,n}^f = \begin{cases} G_{k,n}, & \text{if } G_{k,n} > G'_{k,N'} \\ 0, & \text{otherwise.} \end{cases}$$

9. The method as defined in claim 1, wherein in the frequency domain, the method further comprises:

revising the determination of both the determined plurality of power amplifier gain levels in the adaptive transmitter and the determined plurality of power amplifier gain levels in each of the plurality of adaptive receivers, wherein the adaptive transmitter power amplifier gain levels and the adaptive receiver power amplifier gain levels are dynamically adapted to the estimated channel power gains for each symbol from the mobile stations in the time domain for distributing available transmission power over the subset of subcarriers to maintain a received signal strength for signals received at the base station at a predetermined level.

10. The method as defined in claim 9, wherein the determining step further includes the steps of:

calculating the adaptive transmitter power amplifier gain levels as follows, $$\alpha_{k,n}^t = \alpha_k^t/N, n=1, 2, \ldots, N,$$

where $\alpha_k^t = G_R^t/G_k$, $$G_k = \sum_{n=0}^{N-1} G_{k,n}$$

and $G_R^t$ is the predetermined level; and calculating the adaptive receiver power amplifier gain levels as follows:

$$\beta_{k,n}^t = G_{k,n}, n=1, 2, \ldots, N.$$

11. The method as defined in claim 10, wherein the revising step further includes the steps of:

calculating the adaptive transmitter power amplifier gain levels as follows, $$\alpha_{k,n}^f = \begin{cases} 1/N', & \text{if } G_{k,n} > G'_{k,N'} \\ 0, & \text{otherwise,} \end{cases}$$

where $G_{k,N'}^t$ an order statistic obtained from the ordering step; and calculating the adaptive receiver power amplifier gain levels as follows:

$$\beta_{k,n}^f = \begin{cases} G_{k,n}, & \text{if } G_{k,n} > G'_{k,N'} \\ 0, & \text{otherwise.} \end{cases}$$

12. The method as defined in claim 11, wherein the predetermined level is substantially equal to N-1.

13. The method as defined in claim 9 further including the step of transmitting to each mobile station the adaptive transmitter power amplifier gain levels associated with the transmitter for that mobile station.

14. The method as defined in claim 13 further comprising the step of supplying to the base station receivers the adaptive receiver power amplifier gain levels associated with the receiver of signals from that mobile station.

15. The method as defined in claim 13 further comprising the step of adjusting the controllable gain amplifier gain levels at each adaptive receiver in the base station to a level defined by the associated adaptive receiver power amplifier gain levels in the transmitting step.

16. The method as defined in claim 13, wherein the transmitting step further comprises the steps of: associating the adaptive transmitter power amplifier gain levels from the determining step with a particular mobile station; and associating the adaptive receiver power amplifier gain levels from the determining step with a particular receiver in the base station.

17. An apparatus, comprising:

a receiving module configured to receive signals from a plurality of mobile stations in communication with at least one base station, each mobile station including an adaptive transmitter that includes a plurality of controllable gain amplifiers;

an estimating module configured to estimate channel power gain for each mobile station in response to the received mobile station signals, where the channel power gain is for a subcarrier of the mobile station;

an ordering module configured to order received signals from the mobile stations on a decreasing order basis for the corresponding estimated channel power gain from the mobile station associated with a highest channel gain to the mobile station associated with a lowest channel gain; and a determining module configured to determine, in response to the ordered channel power gains, both a plurality of power amplifier gain levels for the controllable gain amplifiers in the adaptive transmitter and a plurality of power amplifier gain levels for controllable gain amplifiers in each of a plurality of adaptive receivers of the base station, each adaptive receiver being associated with one of the plurality of mobile stations, wherein the transmitter power amplifier gain levels and the adaptive receiver power amplifier gain levels are dynamically adapted to the estimated channel power gains for each symbol from the mobile stations in one of:

a time domain for distributing available transmission power over all subcarriers to maintain a received signal strength for signals received at the base station at a predetermined level, or a frequency domain for distributing available transmission power over a subset of all subcarriers, wherein and the subset of subcarriers exhibits the subset highest estimated channel power gains.

18. The apparatus as defined in claim 17, further comprising a transmitting module configured to transmit to each mobile station the adaptive transmitter power amplifier gain levels associated with the transmitter for that mobile station.

19. The apparatus as defined in claim 18, wherein the adaptive receiver power amplifier gain levels associated with the receiver of signals from the mobile station is supplied to the base station receivers.

20. The apparatus as defined in claim 18, wherein the controllable gain amplifier gain levels at each adaptive receiver in the base station is adjusted to a level defined by the associated adaptive receiver power amplifier gain levels.

21. The apparatus as defined in claim 18, wherein the transmitting module is further configured to:
 associate the adaptive transmitter power amplifier gain levels with a particular mobile station; and
 associate the adaptive receiver power amplifier gain levels with a particular receiver in the base station.

22. The apparatus as defined in claim 17, wherein in the frequency domain, the determining unit is configured to revise the determination of both the determined plurality of power amplifier gain levels in the adaptive transmitter and the determined plurality of power amplifier gain levels in each of the plurality of adaptive receivers, wherein the adaptive transmitter power amplifier gain levels and the adaptive receiver power amplifier gain levels are dynamically adapted to the estimated channel power gains for each symbol from the mobile stations in the time domain for distributing available transmission power over the subset of subcarriers to maintain a received signal strength for signals received at the base station at a predetermined level.

23. An apparatus, comprising:
 means for receiving signals from a plurality of mobile stations in communication with at least one base station, each mobile station including an adaptive transmitter that includes a plurality of controllable gain amplifiers;
 means for estimating channel power gain for each mobile station in response to the received mobile station signals, where the channel power gain is for a subcarrier of the mobile station;
 means for ordering received signals from the mobile stations on a decreasing order basis for the corresponding estimated channel power gain from the mobile station associated with a highest channel gain to the mobile station associated with a lowest channel gain; and
 means for determining, in response to the ordered channel power gains, both a plurality of power amplifier gain levels for the controllable gain amplifiers in the adaptive transmitter and a plurality of power amplifier gain levels for controllable gain amplifiers in each of a plurality of adaptive receivers of the base station, each adaptive receiver being associated with one of the plurality of mobile stations,
 wherein the transmitter power amplifier gain levels and the adaptive receiver power amplifier gain levels are dynamically adapted to the estimated channel power gains for each symbol from the mobile stations in one of:
  a time domain for distributing available transmission power over all subcarriers to maintain a received signal strength for signals received at the base station at a predetermined level, or
  a frequency domain for distributing available transmission power over a subset of all subcarriers, wherein and the subset of subcarriers exhibits the subset highest estimated channel power gains.

24. The apparatus as defined in claim 23, further comprising means for transmitting to each mobile station the adaptive transmitter power amplifier gain levels associated with the transmitter for that mobile station.

25. The apparatus as defined in claim 24, wherein the adaptive receiver power amplifier gain levels associated with the receiver of signals from the mobile station is supplied to the base station receivers.

26. The apparatus as defined in claim 25, wherein the controllable gain amplifier gain levels at each adaptive receiver in the base station is adjusted to a level defined by the associated adaptive receiver power amplifier gain levels.

27. The apparatus as defined in claim 26, wherein the means for transmitting is further configured to:
 associate the adaptive transmitter power amplifier gain levels with a particular mobile station; and
 associate the adaptive receiver power amplifier gain levels with a particular receiver in the base station.

28. The apparatus as defined in claim 23, wherein in the frequency domain, means for determining is configured to revise the determination of both the determined plurality of power amplifier gain levels in the adaptive transmitter and the determined plurality of power amplifier gain levels in each of the plurality of adaptive receivers, wherein the adaptive transmitter power amplifier gain levels and the adaptive receiver power amplifier gain levels are dynamically adapted to the estimated channel power gains for each symbol from the mobile stations in the time domain for distributing available transmission power over the subset of subcarriers to maintain a received signal strength for signals received at the base station at a predetermined level.

* * * * *

UNITED STATES PATENT AND TRADEMARK OFFICE
CERTIFICATE OF CORRECTION

PATENT NO. : 7,860,179 B2
APPLICATION NO. : 12/349219
DATED : December 28, 2010
INVENTOR(S) : Bar-Ness et al.

It is certified that error appears in the above-identified patent and that said Letters Patent is hereby corrected as shown below:

Title Page 2, item (56), under "Other Publications", in Column 1, Line 2, delete "Magaine," and insert -- Magazine, --.

Title Page 2, item (56), under "Other Publications", in Column 2, Line 1, delete "Poewr" and insert -- Power --.

Title Page 2, item (56), under "Other Publications", in Column 2, Line 2, delete "Chennels" and insert -- Channels --.

Column 14, line 25, in Claim 2, delete " $\alpha={}^t_k$ " and insert -- $\alpha_k^t$ --.

Column 15, line 12, in Claim 8, delete "his" and insert -- is --.

Column 16, line 1, in Claim 11, delete " $G_{k,N}^t$ " and insert -- $G_{k,N'}^t$ --.

Signed and Sealed this
Fourteenth Day of June, 2011

David J. Kappos
*Director of the United States Patent and Trademark Office*